(12) United States Patent
Shen et al.

(10) Patent No.: US 11,016,034 B2
(45) Date of Patent: May 25, 2021

(54) OPTICAL SCATTERING MEASUREMENT METHOD AND APPARATUS USING MICRO LENS MATRIX

(71) Applicants: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

(72) Inventors: Manhua Shen, Shanghai (CN); Qiang Wu, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 0 days.

(21) Appl. No.: 15/687,229

(22) Filed: Aug. 25, 2017

(65) Prior Publication Data

US 2018/0080880 A1    Mar. 22, 2018

(30) Foreign Application Priority Data

Sep. 18, 2016  (CN) .......................... 201610826737.8

(51) Int. Cl.
*G01N 21/00*  (2006.01)
*G01N 21/88*  (2006.01)
(Continued)

(52) U.S. Cl.
CPC ..... *G01N 21/8806* (2013.01); *G01N 21/8851* (2013.01); *G01N 21/9501* (2013.01);
(Continued)

(58) Field of Classification Search
CPC ................ G02B 21/06; G02B 21/0024; G02B 21/0068; G02B 21/0076; G01N 21/21;
(Continued)

(56) References Cited

U.S. PATENT DOCUMENTS 5,189,494 A * 2/1993 Muraki ................. G03F 9/7049
250/237 G
5,716,889 A * 2/1998 Tsuji ........................ G03F 9/70
257/797

(Continued)

FOREIGN PATENT DOCUMENTS

CN    1109600        10/1995
CN    1692296 A      11/2005
(Continued)

OTHER PUBLICATIONS

European Patent Application No. EP17191245.4, Extended European Search Report dated Jan. 24, 2018, 7 pages.

(Continued)

*Primary Examiner* — Frank F Huang
(74) *Attorney, Agent, or Firm* — Anova Law Group, PLLC (57) ABSTRACT

An apparatus for detecting a defect on a surface of a substrate includes an optical microlens array disposed adjacent to the substrate and including an array of microlenses configured to direct light incident on a second surface of the optical microlens array to exit a first surface of the optical microlens array opposite the second surface for irradiating the surface of the substrate and converge light emitted from the irradiated surface of the substrate, and an imaging (Continued)

member including a plurality of imaging units configured to receive the converged light of the optical microlens array. Each of the imaging units corresponds to a microlens of the optical microlens array and includes a plurality of pixels and a light transmission opening for transmitting a portion of the incident light. The apparatus requires significantly less time to detect surface defects than conventional substrate surface defect detection devices.

18 Claims, 8 Drawing Sheets

(51) Int. Cl.
| | |
|---|---|
| *G02B 13/00* | (2006.01) |
| *G02B 21/00* | (2006.01) |
| *G01N 21/95* | (2006.01) |
| *G02B 21/18* | (2006.01) |
| *G02B 3/00* | (2006.01) |
| *G01N 21/956* | (2006.01) |
| *G06T 7/00* | (2017.01) |

(52) U.S. Cl.
CPC ......... *G01N 21/956* (2013.01); *G02B 3/0006* (2013.01); *G02B 3/0056* (2013.01); *G02B 3/0062* (2013.01); *G02B 13/0085* (2013.01); *G02B 21/0008* (2013.01); *G02B 21/0016* (2013.01); *G02B 21/18* (2013.01); *G06T 7/0004* (2013.01); *G01N 2021/8887* (2013.01)

(58) Field of Classification Search
CPC ........... G01N 21/6445; G01N 21/6452; G01N 21/6458
See application file for complete search history.

(56) References Cited

U.S. PATENT DOCUMENTS

| | | | |
|---|---|---|---|
| 2006/0012872 A1* | 1/2006 | Hayashi | ................. G01N 21/21 359/386 |
| 2007/0156379 A1* | 7/2007 | Kulkarni | ............. G06F 17/5045 703/14 |
| 2016/0219203 A1* | 7/2016 | Wan | .................... B29C 45/1671 |
| 2019/0052776 A1* | 2/2019 | Kawano | ............ H01L 27/14623 |

FOREIGN PATENT DOCUMENTS

| | | |
|---|---|---|
| CN | 1749829 | 3/2006 |
| CN | 101283453 | 10/2008 |
| CN | 101666620 | 3/2010 |
| JP | 2004327713 | 11/2004 |

OTHER PUBLICATIONS

Chinese Application No. 201610826737.8, Office Action dated May 11, 2020, 7 pages.
Chinese Application No. 201610826737.8, Office Action dated Aug. 16, 2019, 7 pages.

* cited by examiner

Irradiate a portion of a substrate surface through an optical microlens array; receive and converge light emitted from the irradiated portion of the substrate surface by the optical microlens array — S1001

Receive and process the converged light by an imaging member to obtain an image — S1002

OPTICAL SCATTERING MEASUREMENT METHOD AND APPARATUS USING MICRO LENS MATRIX

CROSS-REFERENCES TO RELATED APPLICATIONS

The present application claims priority to Chinese patent application No. 201610826737.8, filed on Sep. 18, 2016, the content of which is incorporated herein by reference in its entirety.

FIELD OF THE INVENTION

The present disclosure relates to semiconductor technology. More particularly, embodiments of the present disclosure relate to an apparatus, method, and system for detecting a surface defect of a substrate.

BACKGROUND OF THE INVENTION

Figure 1A:
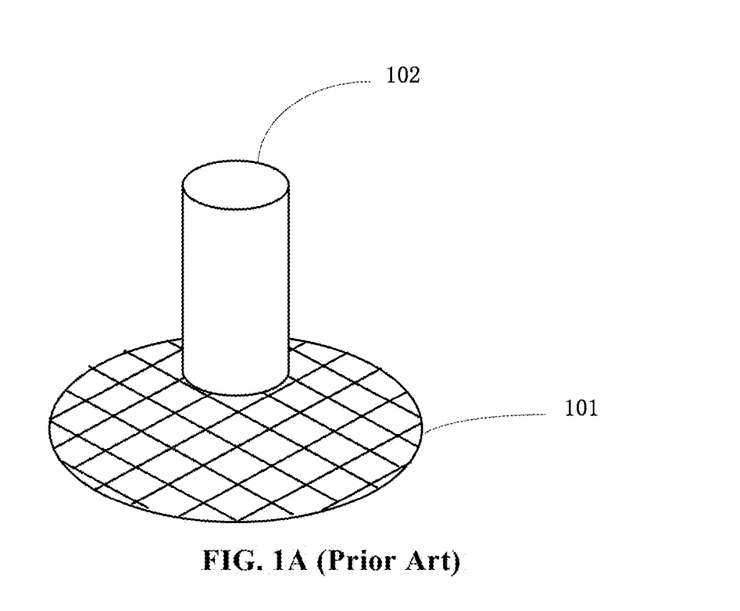
FIG. 1A is a perspective view of an optical device for surface defect detection of a substrate according to the prior art.
Figure 1B:
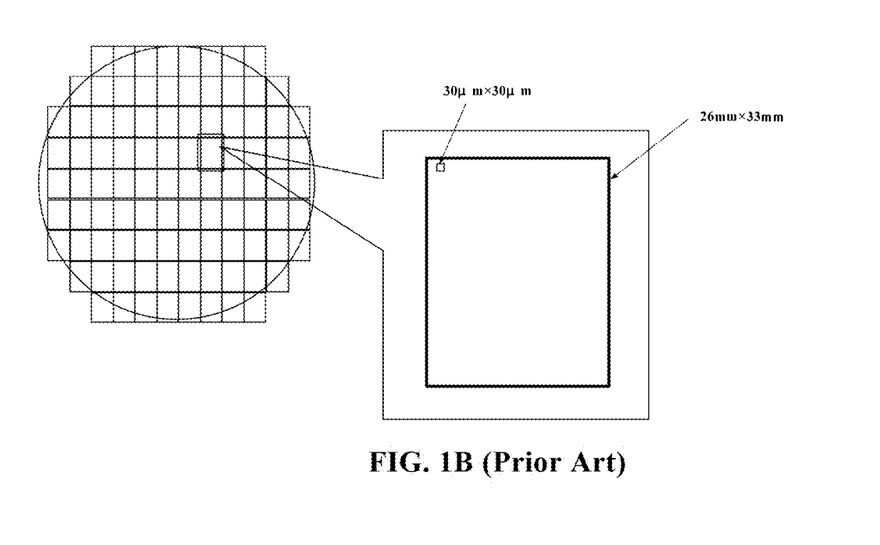
FIG. 1B is a plan view illustrating a substrate and the field of view of the optical device shown in FIG. 1A.

FIG. 1A is a perspective view of a conventional substrate surface defect detection device 102 for detecting surface defects of a substrate 101. FIG. 1B is a plan view of substrate 101 shown in FIG. 1A. As known in the art, the surface defects of substrate 101 need to be detected using a sophisticated and complex optical device 102. FIG. 1B schematically shows the exposure area of substrate 101 and the effective field of view of substrate surface defect detection device 102. The effective field of view of substrate surface defect detection device 102 is typically about 30 μm×30 μm. If surface defect detection device 102 is used to detect surface defects of substrate 101 having a typical exposure area of 26 mm×33 mm, about one million operations must be performed to complete the surface defect detection (e.g., each operation only takes a field of view picture, then 1 million pictures will be taken for the exposure area). If the time required to take a picture plus the time required for the surface defect detection device to move between two different operations takes 0.5 second, it will take 50 million seconds, i.e., about 139 hours to take pictures of the entire exposure area. It can be seen that the efficiency of current substrate surface defect detection devices and methods is low.

BRIEF SUMMARY OF THE INVENTION

The present inventors have discovered the above-described problems and provide herein a novel apparatus, system, and method for detecting defects on the surface of a substrate that can significantly improve the surface defect detection speed.

Embodiments of the present disclosure provide an apparatus for detecting a defect on a surface of a substrate. The apparatus may include an optical microlens array disposed adjacent to the substrate and comprising a plurality of microlenses arranged in an array and configured to direct light incident on a second surface of the optical microlens array to exit a first surface of the optical microlens array opposite the second surface for irradiating the surface of the substrate and converge light emitted from the irradiated surface of the substrate; and an imaging member comprising a plurality of imaging units configured to receive converged light of the optical microlens array, each of the plurality of imaging units corresponding to a microlens of the one or more microlenses arrays and comprising a plurality of pixels and a light transmission opening for transmitting a portion of the incident light. The imaging member is configured to obtain image information of the irradiated surface of the substrate. In one embodiment, the imaging member is also configured to obtain angular spectrum as well as energy spectrum information of the irradiated surface of the substrate.

In one embodiment, the apparatus may further include an incident microlens array comprising a plurality of incident microlenses and configured to receive light from a light source and converge the received light as the incident light onto the optical microlens array.

In one embodiment, the incident microlens array includes a light transmissive back plate and the plurality of incident microlenses are arranged in an array on a surface of the light transmissive back plate. The imaging member includes a second substrate, and the plurality of pixels are formed on a first surface of the second substrate, and a plurality of recesses formed in a second surface of the second substrate opposite the first surface. The incident microlens array is arranged to mate with the imaging member such that each of the incident microlenses is accommodated in a corresponding recess in the imaging member.

In one embodiment, each of the plurality of incident microlenses includes a cylindrical portion disposed on the light transmissive back plate and a lens portion on the cylindrical portion.

In one embodiment, the incident microlenses converge the received light from the light source through the recesses into corresponding light transmission openings such that the converged light passes through the light transmission openings and radially irradiates onto corresponding microlenses.

In one embodiment, the optical microlens array includes a first optical microlens array and a second optical microlens array stacked on top of each other, such that optical axes of respective optical microlenses in the first optical microlens array are aligned with respective optical axes of respective optical microlenses in the second optical microlens array.

In one embodiment, each of the imaging units receives at least a portion of light emitted from the irradiated surface of the substrate.

In one embodiment, the light transmission opening is disposed at an edge of a corresponding imaging unit.

In one embodiment, the portion of the incident light passing through the light transmission opening is incident on an edge portion of a corresponding microlens in the optical microlens array, and the optical microlens array is configured such that the portion of the incident light incident on the edge portion of the corresponding microlens is directed to a portion of the substrate surface located in a center portion of a field of view of the microlens.

In one embodiment, the light transmission opening has a size equal to a size of a pixel.

In one embodiment, the imaging unit has a quadrilateral light receiving surface, and the light transmission opening is disposed at a vertex of the quadrilateral light receiving surface.

In one embodiment, the incident light and the light transmission opening are arranged such that light passing through the light transmission opening does not exceed a diffraction limit.

In one embodiment, the emitted light from the irradiated surface of the substrate comprises reflected light reflected by the irradiated surface of the substrate and diffracted light generated by the irradiated surface of the substrate.

In one embodiment, the optical microlens array further includes a support member disposed at an edge of a microlens and configured to support an adjacent microlens.

In one embodiment, the optical microlens array includes a first optical microlens array and a second optical microlens array stacked on top of each other, and a first support member of the first optical microlens array and a second support member of the second optical microlens array are aligned with each other.

In one embodiment, the support member includes a same material as a material of the microlens.

In one embodiment, the apparatus may further include a barrier layer on a lower surface of the support member for blocking light from entering the support member. In one embodiment, the barrier layer includes a metal plating layer.

In one embodiment, each of the optical microlenses includes a plano-convex lens. In one embodiment, the coordinates of a point on an aspheric surface of the plano-convex lens in a Z-direction are a second order function term and a fourth order function term of a distance r from a corresponding x-y plane projection point to an origin of the x-y plane.

In one embodiment, the aspheric surface of the plano-convex lens is calculated by the following expression:

$$Z = \frac{\frac{1}{R}r^2}{1 + \sqrt{1 - (1+K)\frac{r^2}{R^2}}} + \alpha_1 r^2 + \alpha_2 r^4$$

where Z is the coordinate of the point on the aspheric surface of the lens in the Z-direction, r is a distance from the x-y plane projection point of the aspheric surface to the origin of the x-y plane, R is the radius of curvature from an optical axis to the lens surface, K is a conic constant, $\alpha 1$ is an aspheric surface coefficient of the second order function term, and $\alpha 2$ is an aspheric surface coefficient of the fourth order function term.

In one embodiment, the distance between the second surface of the optical microlens array and the surface of the substrate is in a range between 5 µm and 10 µm.

In one embodiment, each of the microlenses has a diameter in a range between 5 µm and 25 µm.

In one embodiment, the distance from a lens portion of the incident microlens to a corresponding light transmission opening is in a range between 30 µm and 50 µm.

In one embodiment, the apparatus may further include a light generating member for generating light incident to the incident microlens array.

In one embodiment, the apparatus may further includes a spacer disposed on a sidewall of the optical microlens array for blocking ambient light from entering the microlenses.

In one embodiment, the substrate is one of a semiconductor wafer, a semiconductor substrate, a display panel, or a quartz substrate.

Embodiments of the present disclosure also provide a system for detecting a defect on a surface of a substrate. The system may include an apparatus comprising an optical microlens array disposed adjacent to the substrate and comprising a plurality of microlenses arranged in an array and configured to direct light incident on a first surface of the optical microlens array to exit a second surface of the optical microlens array opposite the first surface for irradiating the surface of the substrate and converge light emitted from the irradiated surface of the substrate; an imaging member comprising a plurality of imaging units configured to receive converged light of the optical microlens array, each of the plurality of imaging units corresponding to a microlens of the optical microlens array and comprising a plurality of pixels and a light transmission opening for transmitting a portion of the incident light, the imaging member being configured to obtain image information of the irradiated surface of the substrate. The system may also include a substrate support unit disposed below the apparatus and configured to support the substrate, and an imaging processing unit coupled to the apparatus and configured to receive and process the image information of the irradiated surface of the substrate. The imaging member is configured to obtain image information of the irradiated surface of the substrate. In one embodiment, the imaging member is also configured to obtain angular spectrum as well as energy spectrum information of the irradiated surface of the substrate. In one embodiment, the imaging processing unit is also configured to receive and process the angular spectrum as well as energy spectrum information of the irradiated surface of the substrate.

Embodiments of the present disclosure further provide a method for detecting a defect on a surface of a substrate. The method may include irradiating light to a portion of the surface of the substrate through the optical microlens array; receiving and converging light emitted from the irradiated surface portion of the substrate through the optical microlens array; receiving and processing the converged light by an imaging member to obtain image, angular spectrum, and an energy spectrum information of the irradiated portion surface of the substrate.

In one embodiment, the method may further include moving the optical microlens array to a next portion of the surface of the substrate; irradiating light to the next portion of the surface of the substrate through an optical microlens array; receiving and converging light emitted from the irradiated next surface portion of the substrate through the optical microlens array; receiving and processing the converged light by the imaging member to obtain image, angular spectrum, and an energy spectrum information of the irradiated next portion surface of the substrate; and repeating the moving, irradiating, receiving and converging, and receiving and processing steps until image information of the entire surface of the substrate is obtained.

In one embodiment, the method may further include, after obtaining the image, angular spectrum, and an energy spectrum information of the entire surface of the substrate, rotating the substrate at 90 degrees, 180 degrees and 270 degrees around a normal at the center of the substrate as a rotating axis; and repeating the moving, irradiating, receiving and converging, and receiving and processing steps until the image, angular spectrum, and an energy spectrum information of the entire surface of the substrate is obtained for each of 90 degrees, 180 degrees and 270 degrees positions of the substrate.

The following description, together with the accompanying drawings, will provide a better understanding of the nature and advantages of the claimed disclosure.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

It should be understood that the drawings are not drawn to scale, and similar reference numbers are used for representing similar elements. Embodiments of the invention are described herein with reference to cross-section illustrations that are schematic illustrations of idealized embodiments (and intermediate structures) of the invention. The thickness of layers and regions in the drawings may be exaggerated relative to each other for clarity. Additionally, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

It will be understood that, when an element or layer is referred to as "on," "disposed on," "adjacent to," "connected to," or "coupled to" another element or layer, it can be disposed directly on the other element or layer, adjacent to, connected or coupled to the other element or layer, or intervening elements or layers may also be present. In contrast, when an element is referred to as being "directly on," directly disposed on," "directly connected to," or "directly coupled to" another element or layer, there are no intervening elements or layers present between them. It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Relative terms such as "under," "below," "underneath," "over," "on," "above," "bottom," and "top" are used herein to described a relationship of one element, layer or region to another element, layer or region as illustrated in the figures. It will be understood that these terms are intended to encompass different orientations of the structure in addition to the orientation depicted in the figures. For example, if the device shown in the figures is flipped, the description of an element being "below" or "underneath" another element would then be oriented as "above" the other element. Therefore, the term "below," "under," or "underneath" can encompass both orientations of the device. Because devices or components of embodiments of the present disclosure can be positioned in a number of different orientations (e.g., rotated 90 degrees or at other orientations), the relative terms should be interpreted accordingly.

The terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. Furthermore, as used herein, the words "and/or" may refer to and encompass any possible combinations of one or more of the associated listed items.

The use of the terms first, second, etc. do not denote any order, but rather the terms first, second, etc. are used to distinguish one element from another. Furthermore, the use of the terms a, an, etc. does not denote a limitation of quantity, but rather denote the presence of at least one of the referenced items.

The term "vertical" as used in this application is defined as a plane perpendicular to the conventional plane or surface of a water or substrate, regardless of the orientation of the wafer or substrate. The term "horizontal" refers to a direction perpendicular to the vertical as defined above.

As used herein, the terms "device" and "apparatus" are used interchangeably. The terms "microlens" and "optical microlens" are used interchangeably. The terms "microlens array" and "optical microlens array" are used interchangeably. The terms "to be tested substrate" and "to be detected substrate" are used interchangeably. The terms "to be tested surface' and "to be detected surface" are used interchangeably.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It should be noted that similar parts are given reference numerals and symbols as similar as possible throughout the drawings. Once a part has been defined and described, it will not be described again in subsequent drawings.

In the present disclosure, a substrate may include one or more wafers selected from the group consisting of a semiconductor wafer, a semiconductor substrate, a display panel, and a quartz substrate.

The present disclosure will be described by way of illustrating embodiments with reference to the accompanying drawings.

Figure 2:
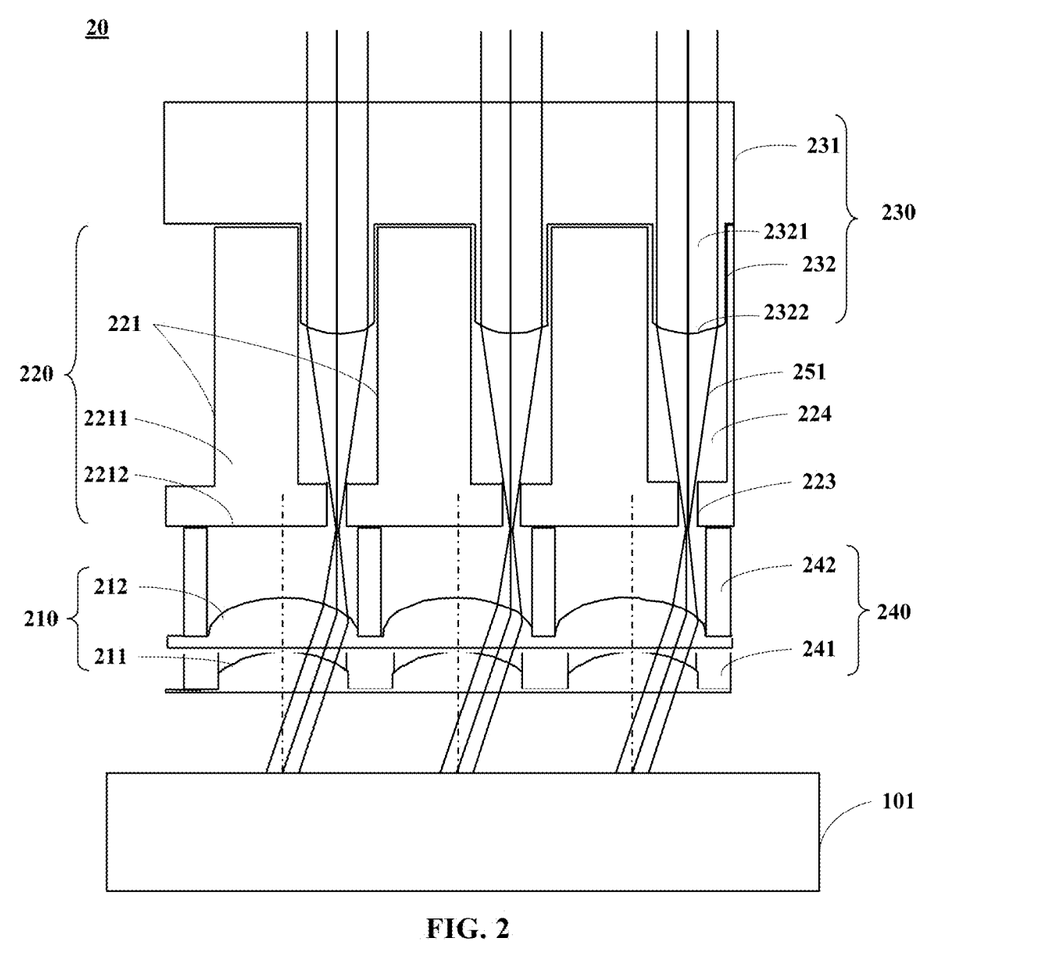
FIG. 2 is a schematic cross-sectional view of a substrate surface defect detection apparatus according to an embodiment of the present disclosure.

FIG. 2 is a schematic cross-sectional view illustrating a structure of a substrate surface defect detection device 20 according to an embodiment of the present disclosure. As shown in FIG. 2, substrate surface defect detection device 20 may include at least one optical microlens array 210 and an imaging member 220. The optical microlens array and the imaging member will be described in detail below.

Referring to FIG. 2, at least one optical microlens array 210 is disposed adjacent to a substrate 101 (e.g., the substrate may be a semiconductor wafer, a semiconductor substrate, a display panel, or a quartz substrate). The at least one optical microlens array may include one or more optical microlens arrays stacked on top of each other. Each optical microlens array may include a plurality of optical microlenses arranged in an array. The one or more optical microlens arrays are configured to guide incident light 251 (e.g., light having a wavelength in the range between 400 nm and 650 nm) to irradiate the surface of a to be tested substrate 101. For example, light emitted from the irradiated surface of substrate 101 may include reflected light reflected by the irradiated substrate surface and diffracted light generated by the irradiated substrate surface. In one embodiment, each of the optical microlenses may include quartz glass, e.g., melted quartz.

In one embodiment, at least one optical microlens array 210 may include a first optical microlens array 211 and a second optical microlens array 212 stacked on top of each other. Of course, at least one microlens array 210 may include more than two optical microlens arrays, such as a third optical microlens array disposed on second optical microlens array 212. Adjacent optical microlens arrays can be assembled together using glue.

In one embodiment, at least one microlens array 210 may be configured such that the optical axes of the microlenses in one microlens array are aligned with the optical axes of the corresponding microlenses in another microlens array. For example, the optical axes of the optical microlenses in optical microlens array 211 are aligned with the corresponding optical axes of the optical microlenses in optical microlens array 212 (the optical axes are indicated by the dotted lines shown in FIG. 2).

In one embodiment, an optical microlens array may also include a support member (e.g., a cylindrical pillar) 240 disposed at the peripheral edge of the microlenses that can be used to support a microlens adjacent thereto (e.g., a first support member 241 and a second support member 242). In one embodiment, the support member (i.e., first support member 241) of first microlens array 211 and the support member (i.e., second support member 242) of second microlens array 212 are aligned with each other, as shown in FIG. 2. In one embodiment, the support member may be formed of the same material as the optical microlens, e.g., the support member and the optical microlens each include quartz glass. In one embodiment, the support member may be bonded with the optical microlens using glue. In the embodiment, the distance between adjacent optical microlens arrays can be precisely controlled by the support member.

In one embodiment, each of the microlenses includes a plano-convex lens. The coordinates of a point on an aspheric surface of the plano-convex lens in a Z-direction (along the optical axis of the microlens) are a second order function term and a fourth order function term of a distance r from a corresponding x-y plane projection point to the origin of the x-y plane.

In one embodiment, the aspheric surface of the plano-convex lens is calculated by the following expression:

$$Z = \frac{\frac{1}{R}r^2}{1+\sqrt{1-(1+K)\frac{r^2}{R^2}}} + \alpha_1 r^2 + \alpha_2 r^4$$

where Z is the coordinate of the point on the aspheric surface of the lens in the Z-direction, r is the distance from the x-y plane projection point of the aspheric surface to the origin of the x-y plane (r is a variable, the maximum value of r may be, e.g., the radius of the optical microlens), R is the radius of curvature from the optical axis to the lens surface, K is a conic constant, $\alpha_1$ is an aspheric surface coefficient of the second order function term, and $\alpha_2$ is an aspheric surface coefficient of the fourth order function term. K=0 for a spherical surface, K<−1 for a hyperboloid shape, K=−1 for paraboloid, −1<K<0 for an ellipse shape, K>1 for a flat ellipse shape. For the plano-convex microlens of the embodiment, K may be 0 (zero).

In one embodiment, for first optical microlens array 211, R=−0.11 mm, $\alpha_1$=9.506, $\alpha_2$=−8.614×10$^4$, K=0, the aspherical surface of a microlens of first optical microlens array 211 may be calculated by the following expression:

$$Z = \frac{\frac{1}{-0.11}r^2}{1+\sqrt{1-\frac{r^2}{(-0.11)^2}}} + 9.506r^2 - 8.614 \times 10^4 r^4$$

In one embodiment, for second optical microlens array 212, R=0.016 mm, $\alpha_1$=−74.284, $\alpha_2$=4.01×10$^4$, K=0, the aspherical surface of a microlens of second optical microlens array 212 may be calculated by the following expression:

$$Z = \frac{\frac{1}{0.016}r^2}{1+\sqrt{1-\frac{r^2}{0.016^2}}} - 74.284r^2 + 4.01 \times 10^4 r^4$$

It is to be noted that the optical microlenses in the optical microlens array may include, but not limited to, a plano-convex lens element, a convex lens element, a convex-concave (meniscus) lens element, and the like, as long as the optical microlens can converge light. In practice, for ease of processing and assembling of the optical microlenses, it is preferable to use a plano-convex lens element as an optical microlens. Since the plano-convex lens includes a flat surface, it facilitates the processing and assembling of the optical microlens array, thereby reducing costs.

In one embodiment, the at least one optical microlens array may include a first surface facing toward substrate 101, e.g., the flat surface of first microlens array 211 as shown in FIG. 2. The distance from the first surface to the surface of to be tested substrate 101 may be in the range between 5 μm and 10 μm, e.g., 6 μm. Optical microlens array 210 also has a second surface facing toward imaging member 220. Optical microlens array 210 is configured to irradiate light to the surface of substrate 101 and receive and converge light emitted from the irradiated surface of the substrate.

Referring still to FIG. 2, imaging member 220 is configured to receive the converged light from light emitted from the irradiated surface of substrate 101 through optical microlens array 210 for imaging. Imaging member 220 may include a plurality of imaging units 221. Each of imaging units 221 corresponds to one of the microlenses of the optical microlens arrays (e.g., first optical microlens array 211 and second optical microlens array 212 of at least one microlens array 210). Each of imaging units 221 may include a plurality of pixels 2212 and a light transmission opening 223 (which will be described in more detail below in connection with FIG. 4). The pixels are configured to receive light for imaging. In one embodiment, imaging member 220 may also include a second substrate 2211. The plurality of pixels 2212 are formed on a first surface of second substrate 2211. A plurality of recesses 224 are formed in second substrate 2211 in a second surface opposite to the first surface where pixels 2212 are formed.

In one embodiment, each of imaging units 221 receives at least a portion of the light emitted from the surface of the to be tested substrate. In one embodiment, the imaging unit may include a charge coupled device (CCD), a complementary metal oxide semiconductor (CMOS) image sensor device, and the like.

In one embodiment, substrate surface defect detection device 20 may also include an incident microlens array 230, as shown in FIG. 2. Incident microlens array 230 may include a plurality of incident microlenses 230. Each of incident microlenses 230 is configured to receive light from a light source (not shown) and converge the received light as an incident light 251 onto a corresponding optical microlens of optical microlens array 210.

In one embodiment, incident microlenses 232 converge light from the light source through a corresponding recess 224 in light transmission opening 223 so that the converged light passes through the light transmission opening and then radiates to a corresponding microlens. It is to be understood that this is merely illustrative, and that different configurations may be employed in other embodiments.

In one embodiment, incident light 251 is incident on the edge portion of a corresponding optical microlens in microlens array 210 through light transmission opening 223, and microlens array 210 is configured such that the incident light incident on the edge portion of the corresponding microlens is guided to a portion of the substrate surface located in the center of the field of view of the microlens. In one embodiment, incident light 251 and light transmission opening 223 are arranged so that light passing through light transmission opening 223 does not exceed the diffraction limit.

In one embodiment, referring to FIG. 2, incident microlens array 230 may include a light transmissive back plate 231 and a plurality of incident microlenses 232 arranged in an array on the surface of light transmissive back plate 231. In one embodiment, incident microlenses 232 each may include a cylindrical portion 2321 and a lens portion 2322 disposed on cylindrical portion 2321. In one embodiment, the distance between lens portion 2322 of incident microlens 232 and a corresponding light transmission opening 223 of imaging units 221 is in the range between 30 μm and 50 μm, e.g., 36 μm. Incident microlens array 230 is configured to mate with imaging member 220 such that each of the incident microlenses is accommodated in one corresponding recess 224.

As will be explained in more detail below, the substrate surface defect detection device provided by the present disclosure can detect surface defects of a substrate using an imaging obtained by an optical microlens array. Because the optical microlens array may include a plurality of optical microlenses, the image of the substrate surface at different locations of the substrate can be obtained by moving the substrate only one time, so that the detection speed of surface defects of the substrate can be increased.

Figure 3:
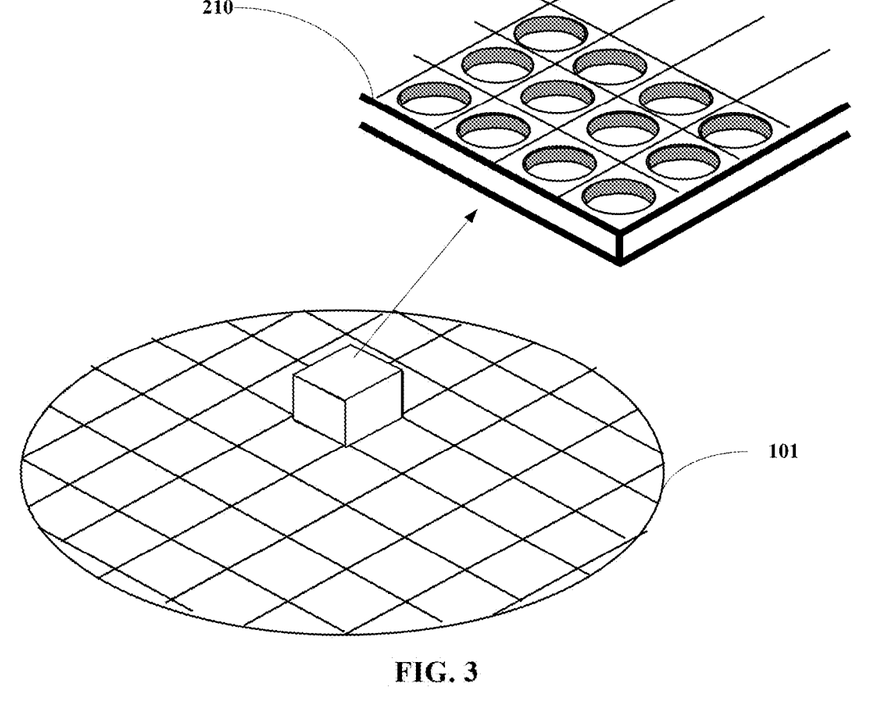
FIG. 3 is a perspective view illustrating the positional relationship between an optical microlens array and a substrate surface according to an embodiment of the present disclosure.

In practical applications, the substrate surface defect detection speed can be improved multiple times by setting the appropriate size of the optical microlens array, the diameter of the optical microlens, and the field of view of the optical microlens. For example, assuming that the diameter of the microlens is 10 μm, the size of the optical microlens array can be set to be the same as the exposure area. For example, an optical microlens array comprising 1300×1650 microlenses may be provided for an exposure area of 26 mm×33 mm. Thus, as shown in FIG. 3, when any of the imaging points in the optical field of the optical microlens satisfies the diffraction limit in a field of view of 2 μm×2 μm, an exposure area can be obtained with only 100 pictures, and the detection speed can be increased to 10000 times the detection speed of conventional surface defect detection techniques. Of course, when taking into account the diffraction light at multiple angles, the substrate can be rotated 90 degrees, 180 degrees, and 270 degrees, respectively to separately detect defects of the substrate surface, so that 400 pictures need to be scanned, and the detection speed can be increased to 2500 times the speed of conventional techniques.

Of course, it is to be understood that the size of the optical microlens array may be set to be different from the exposure area and still can improve the defect detection speed. For example, the optical microlens array may be set to be an array of 100×100 microlenses or 1000×1000 microlenses, etc.

In some embodiments, the substrate surface defect detection can be accomplished by using an optical microlens array, and because the size of the optical microlens array is small, two or more optical microlens arrays may be used, for example, to achieve the diffraction limit. Due to the large number of optical microlenses, the detection speed can be greatly improved using a parallel imaging approach.

Figure 4:
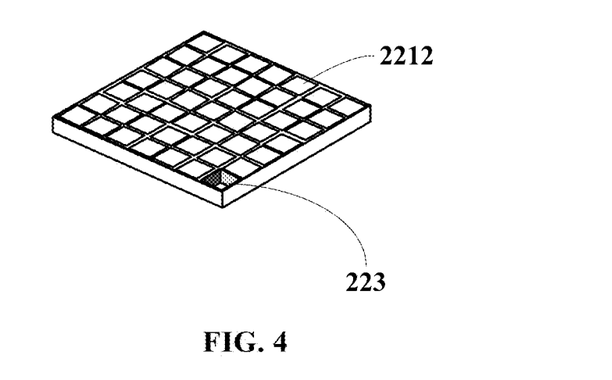
FIG. 4 is a perspective view illustrating an imaging unit according to an embodiment of the present disclosure.

FIG. 4 is a perspective view illustrating a 7×7 imaging unit according to an embodiment of the present embodiment. Referring to FIG. 4, light transmission opening 223 may be provided at the edge of a corresponding imaging unit. For example, the light-receiving surface of the imaging unit may have a quadrilateral shape (e.g., square, rectangular, diamond, rhombus, trapezoid, etc.), and light transmission opening 223 may be disposed at the vertex of the quadrilateral surface. It will be appreciated by those skilled in the art that the light transmission opening may also be disposed at other locations of the imaging unit, for example, the light transmission opening may be disposed at the edge (periphery) of the imaging unit and at a non-vertex location, or in the vicinity of the middle portion of the imaging unit. The scope of the present disclosure is not limited thereto.

In one embodiment, light transmission opening 223 has a size corresponding to the size of pixel 2212. In one embodiment, it is possible to remove a pixel of the imaging unit to form a light transmission opening, as shown in FIG. 4. In one embodiment, the Kohler lighting technique can be implemented by removing a portion of the imaging unit.

Figure 5:
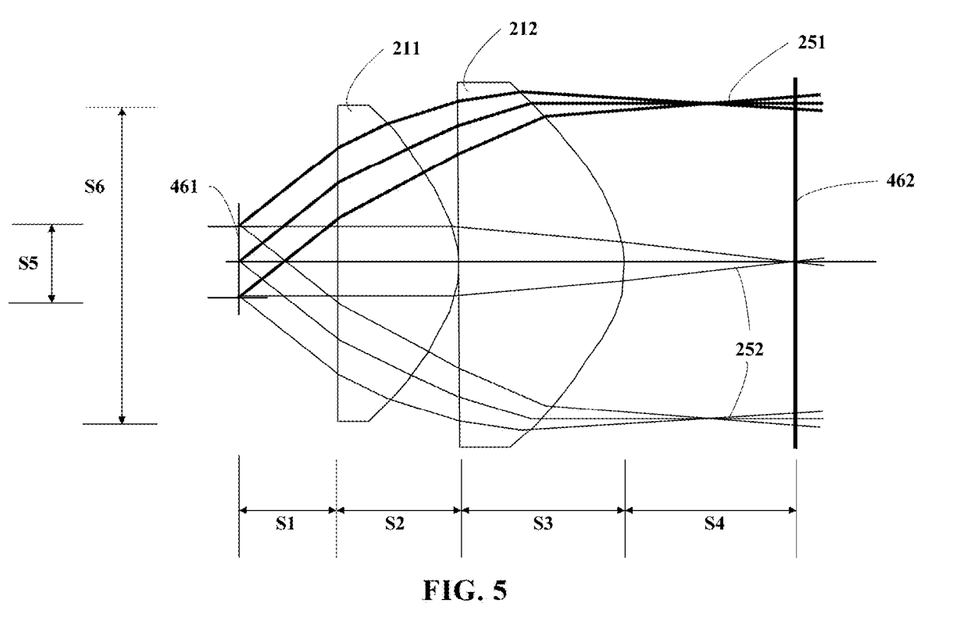
FIG. 5 is a schematic cross-sectional view of an optical imaging microlens according to an embodiment of the present disclosure.

FIG. 5 is a schematic cross-sectional view illustrating an optical microlens according to an embodiment of the present disclosure. Referring to FIG. 5, the optical path through the microlens is shown. Incident light 251 incident on the periphery of a second optical microlens of second optical microlens array 212 passes through the second optical microlens to reach a periphery portion of a corresponding first microlens of first optical microlens array 211, and then passes through the first microlens to irradiate a center portion of the field of view 461 of the to be tested surface of the substrate. Emitted light reflected by the irradiated surface of the substrate and diffracted light generated by the irradiated surface of the substrate (collectively referred to as emitted light 252 radiated from the irradiated surface of the substrate) pass through the optical microlens array to reach the back focal plane (also referred to as Fourier plane) 462 of the optical microlens array. An imaging unit may be placed at back focal plane 462 to receive light 252 emitted by the irradiated surface of the substrate.

Further, referring still to FIG. 5, the distance S1 between the first surface of the first optical microlens of first optical microlens array 211 and the surface of the substrate is in the range between 5 µm and 10 µm, e.g., 6 µm. The first microlens of first optical microlens array 211 has a central thickness S2 along the optical axis in the range between 1 µm and 10 µm, e.g., 6 µm. The second microlens of second optical microlens array 212 has a central thickness S3 along the optical axis in the range between 1 µm and 10 µm, e.g., 7 µm. The distance S4 between second optical microlens array 212 and back focal plane 462 along the optical axis is in the range between 5 µm and 10 µm, e.g., 6.5 µm. The field width S5 of an optical microlens is in the range between 1 µm and 3 µm, e.g., 2 µm. The diameter S6 of an optical microlens is in the range between 5 µm and 25 µm, e.g., 10 µm or 20 µm.

Figure 6:
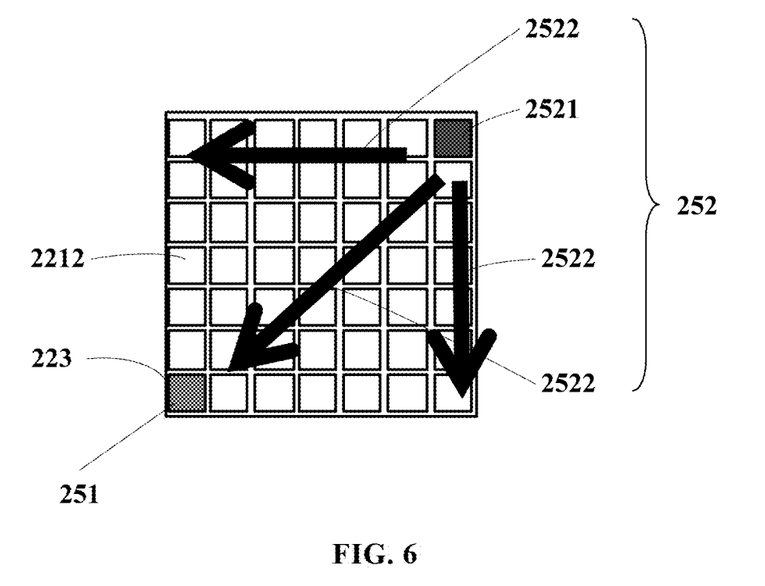
FIG. 6 is a schematic view illustrating an image forming member for receiving and diffracting light according to an embodiment of the present disclosure.

FIG. 6 is a plan view illustrating an imaging member for receiving reflected light and diffracted light according to an embodiment of the present disclosure. Referring to FIG. 6, incident light 251 passing through light transmission opening 223 will pass through the optical microlens array (not shown in FIG. 6) to the surface of substrate 101 (not shown in FIG. 6), and reflected light 2521 from the surface of the substrate (also referred to as zero-order diffraction light) and diffracted light 2522 generated by the surface of the substrate will pass through the optical microlens array to the light receiving surface of an imaging unit, so that the imaging unit obtains information of the surface of substrate 101.

Figure 7A:
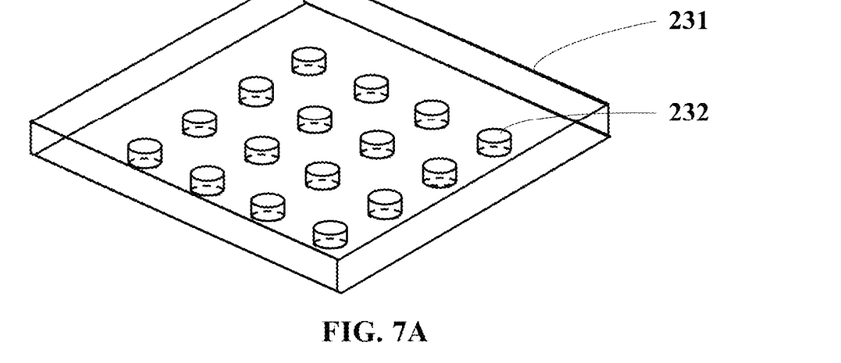
FIG. 7A is a perspective view of an incident microlens array according to an embodiment of the present disclosure.
Figure 7B:
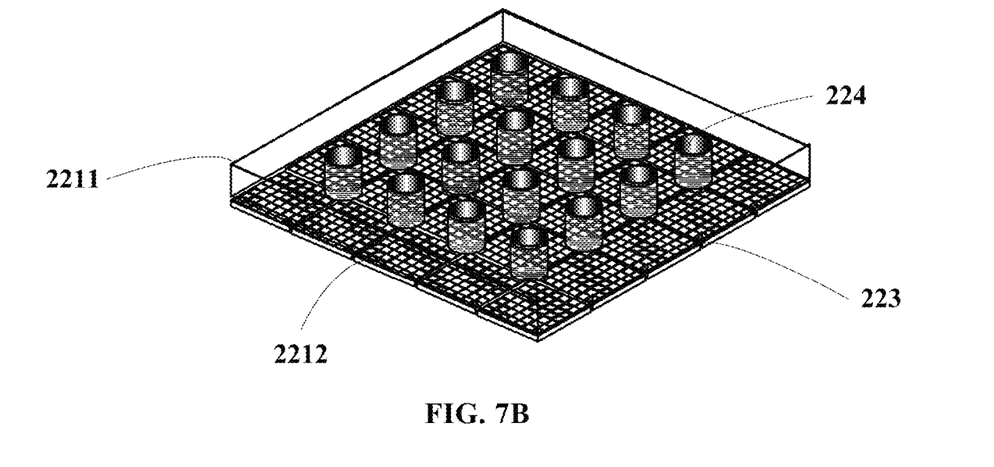
FIG. 7B is a perspective view of an imaging member according to an embodiment of the present disclosure.
Figure 7C:
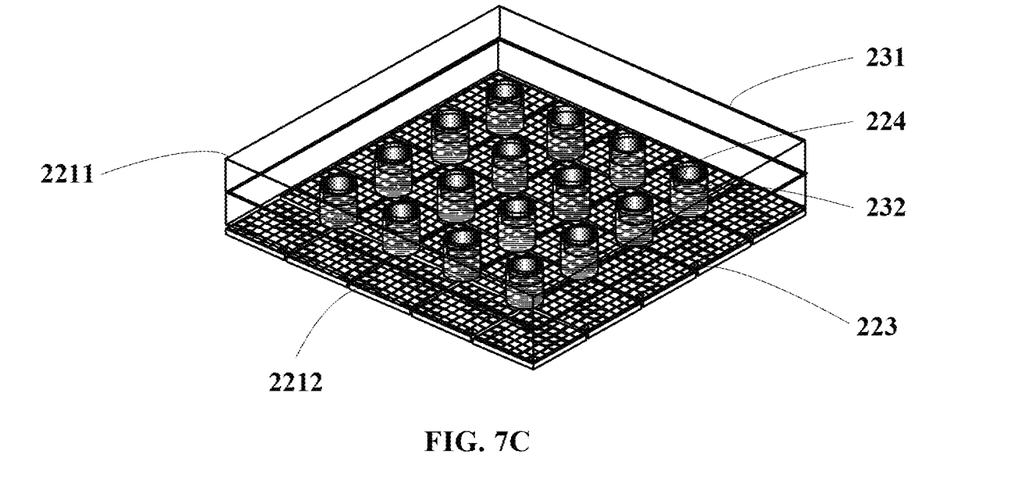
FIG. 7C is a perspective view of an assembly of the microlens array of FIG. 7A and the imaging member of FIG. 7B according to an embodiment of the present disclosure.

FIG. 7A is a perspective view illustrating an incident microlens array according to an embodiment of the present disclosure. FIG. 7B is a schematic view of an imaging member according to an embodiment of the present disclosure. FIG. 7C is a perspective view of an assembly of the incident microlens array of FIG. 7A and the imaging member of FIG. 7B according to an embodiment of the present disclosure. The assembly of the incident microlens array and the imaging member will be described below with reference to FIGS. 7A through 7C. FIG. 7A schematically shows an array of 4×4 incident microlenses 232 disposed on light transmission back plate 231. FIG. 7B schematically shows an imaging member having 4×4 recesses 224. Each of recesses 224 corresponds to a light transmission opening 223 of one of the imaging units. The incident microlens array is combined (assembled) with the imaging member so that the plurality of incident microlenses 232 are accommodated in the plurality of corresponding recesses 224, respectively, to form the combined structure shown in FIG. 7C.

Figure 8:
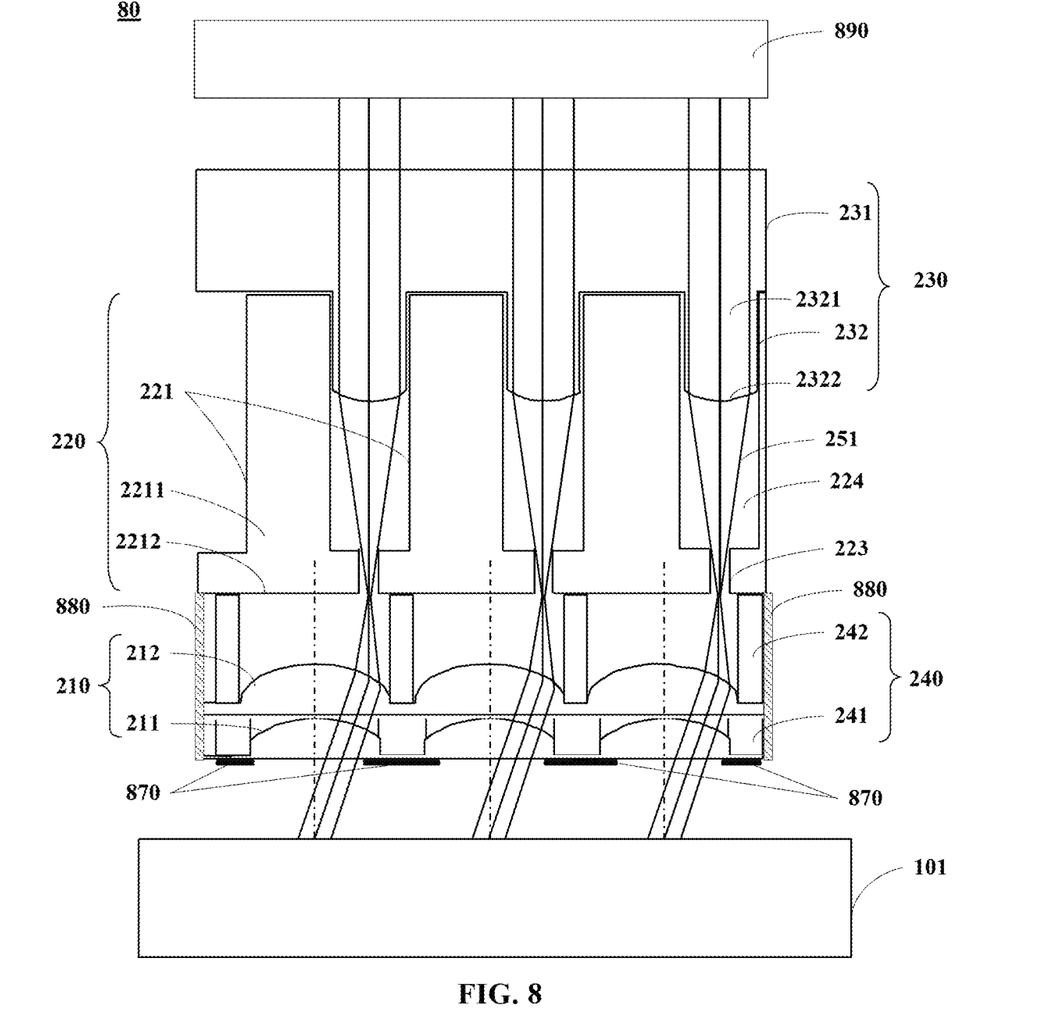
FIG. 8 is a schematic cross-sectional view of a substrate surface defect detection apparatus according to another embodiment of the present disclosure.

FIG. 8 is a schematic view of a substrate surface defect detection apparatus 80 according to another embodiment of the present disclosure. Referring to FIG. 8, substrate surface defect detection apparatus 80 is similar to substrate surface defect detection apparatus 20 of FIG. 2 and includes at least one optical microlens array 210, an imaging member 220, and an incident microlens array 230.

In one embodiment, substrate surface defect detection apparatus 80 may further include a barrier layer 870 disposed on the lower surface of support member 240 for blocking light from entering support member 240. The barrier layer may reduce or eliminate the likelihood of undesired reflected light or diffracted light from entering the support member. In one embodiment, the barrier layer may include a metal plating layer.

Further, ambient light and other undesirable light may also enter the optical microlenses through the sides of the optical microlens array, thereby affecting the imaging quality. In order to eliminate the effect of ambient light on the imaging quality, in one embodiment, substrate surface defect detection apparatus 80 may further include a spacer 880 disposed on the sidewalls of the optical microlens array for blocking ambient light from entering the optical microlenses.

In one embodiment, substrate surface defect detection apparatus 80 may further include a light generating member 890 for generating light incident on incident microlens array 230. In one embodiment, the light generating member may include a light emitting device, e.g., a laser, a lighting plate, an illumination lamp, or a light combination device including a combination of one of the laser, a lighting plate, an illumination lamp and other optical devices (e.g., mirror).

Figure 9:
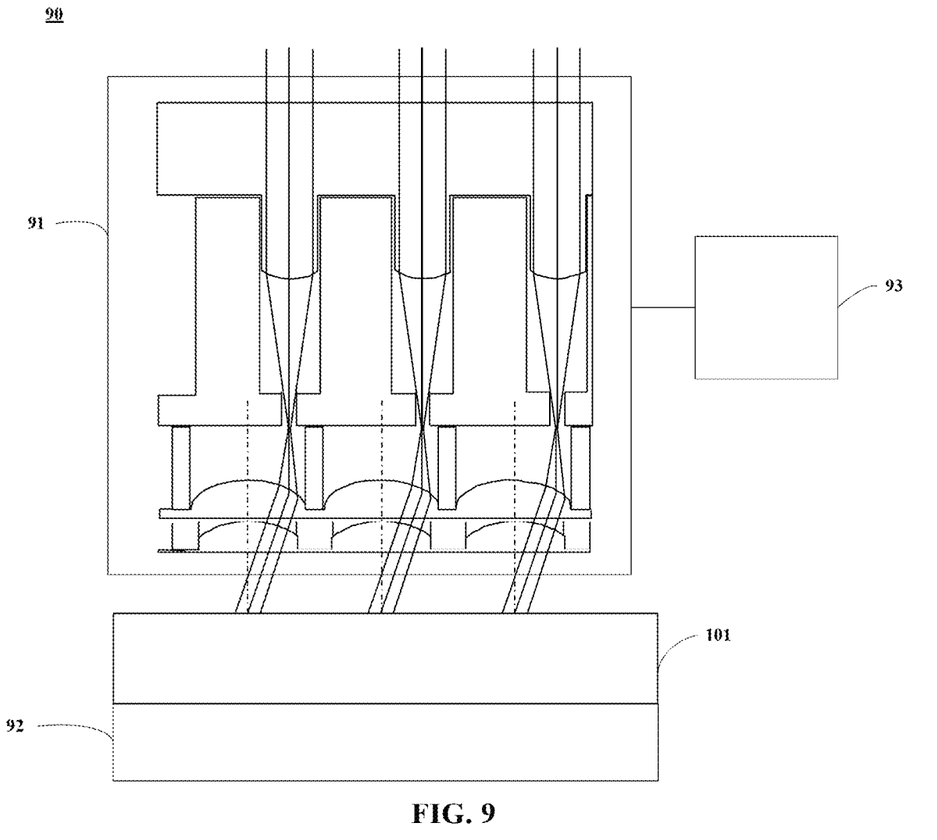
FIG. 9 is a schematic cross-sectional view of a substrate surface defect detection system according to an embodiment of the present disclosure.

FIG. 9 is a schematic view of a substrate surface defect detection system 90 according to an embodiment of the present disclosure. Referring to FIG. 9, substrate surface defect detection system 90 may include a device 91 for detecting substrate surface defects. Device 91 is configured to obtain image information of the surface of substrate 101. In one embodiment, device 91 may have a similar or the same structure of substrate surface defect detection apparatus 20 of FIG. 2. In another embodiment, device 91 for detecting substrate surface defects may have a similar or the same structure of substrate surface defect detection apparatus 80 of FIG. 8.

In one embodiment, referring to FIG. 9, substrate surface defect detection system 90 may also include a substrate support unit 92 disposed below device 91 and configured to support substrate 101.

In one embodiment, referring still to FIG. 9, substrate surface defect detection system 90 may also include an imaging processing unit 93 coupled to substrate surface defect detection device 91 and configured to receive and process the image information. In one embodiment, the imaging processing unit may be connected to the imaging unit of device 91 for detecting defects of the substrate surface. In one embodiment, the imaging processing unit may be a computing device, a display device, and the like disposed in the vicinity of the substrate surface defect detection device. In one embodiment, the imaging processing unit may be located remotely from the substrate surface defect detection device and connected to thereto through a local area network, a wide area network, a wireless network, or the Internet.

In one embodiment, device 91 of system 90 optically scans the surface of substrate 101, obtains image information of the scanned surface, and transmits the image information to image processing unit 93. In this case, image processing unit 93 processes the received image information and provides defect data of the processed image of the substrate surface to inspection personnel.

Figure 10:
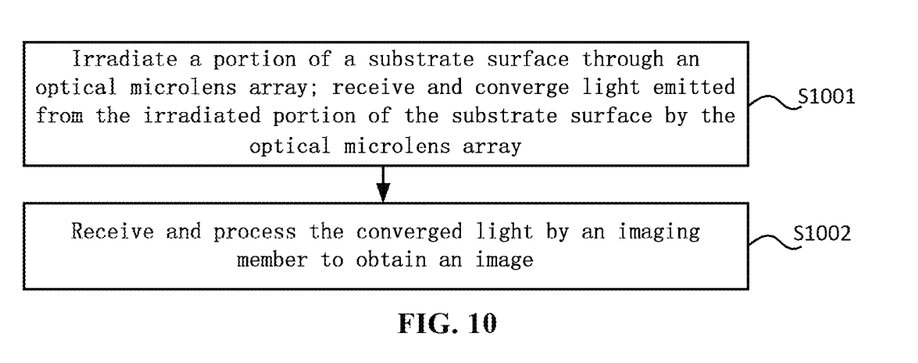
FIG. 10 is a simplified flowchart of a method for detecting surface defects of a substrate according to an embodiment of the present disclosure.

FIG. 10 is a flowchart of a method for detecting defects of a surface of a to be detected substrate according to an embodiment of the present disclosure. The method may include the following steps:

Step S1001: irradiating incident light to a portion surface of a to be tested substrate through an optical microlens array; converging light emitted from the irradiated portion surface of the substrate through the optical microlens array.

Step S1002: receiving and processing the converged light by an imaging member to obtain an image of the irradiated portion surface of the substrate.

Through the above steps, it is possible to obtain image information of the irradiated portion surface of the substrate.

Figure 11:
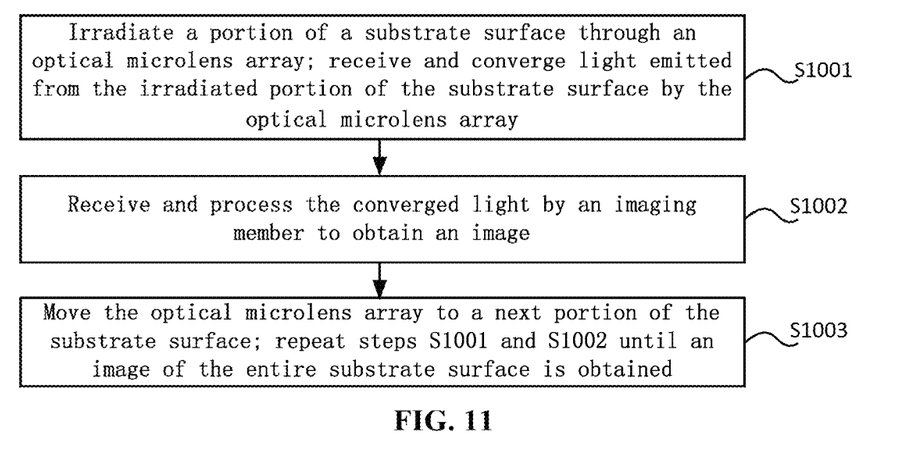
FIG. 11 is a simplified flowchart of a method for detecting surface defects of a substrate according to another embodiment of the present disclosure.

FIG. 11 is a flowchart of a method for detecting defects of a surface of a to be detected substrate according to another embodiment of the present disclosure. The method may include the following steps:

Step S1001: irradiating incident light to a portion surface of a to be detected substrate using an optical microlens array; converging light emitted from the irradiated portion surface of the to be detected substrate through the optical microlens array.

Step S1002: receiving and processing the converged light by an imaging member to obtain an image of the portion surface of the substrate.

Step S1003: moving the optical microlens array to a next portion surface of the substrate, repeating steps S1001, S1002, and S1003 until the entire surface of the substrate is scanned.

Through the above-described method, image information of the entire surface of the to be tested substrate can be obtained.

In the foregoing description, in the case where the light transmission opening is provided at the first vertex of the quadrilateral light receiving surface of the imaging unit, reflected light from the to be tested surface will be irradiated at the second vertex disposed diagonally to the first vertex, and received diffracted light centered at the second vertex is gradually decreasing in a direction moving away from the second vertex. In order to obtain diffracted light from multiple angles, the method may include, after step S1003, rotating the substrate by 90 degrees, 180 degrees, and 270 degrees around the normal at the center of the substrate as a rotating axis, respectively, and repeating steps S1001, S1002, and S1003 after each rotation of 90 degrees, 180 degrees, and 270 degrees, respectively. The operations of steps S1001, S1002, and S1003 are performed in the case where the substrate is at the positions of 0 degree, 90 degrees, 180 degrees, and 270 degrees, respectively, so that four sets of image information of the substrate surface are obtained. The four sets of image information are then processes to obtain relatively uniform image information of the substrate surface.

In the embodiment, incident light in the vertex position can maximize the use of a 0.7 NA (numerical aperture). Taking the diameter of 20 μm of the optical microlenses as an example, the size of the optical image array can be set to be the same as the exposure area. In the case where the optical microlenses satisfy the diffraction limit at any point in the field of view of 2 μm×2 μm, taking into account that the substrate surface is scanned in the four directions of 0 degree, 90 degrees, 180 degrees, and 270 degrees, the total number of scanning is 100×4=400 times, so that the detection speed is 2500 times better than the speed achieved using current known techniques. Therefore, the device and method for detecting surface defects of a substrate of the present disclosure can greatly improve the defect detection speed.

While the present disclosure is described herein with reference to illustrative embodiments, this description is not intended to be construed in a limiting sense. Rather, the purpose of the illustrative embodiments is to make the spirit of the present disclosure be better understood by those skilled in the art. In order not to obscure the scope of the disclosure, many details of well-known processes and manufacturing techniques are omitted. Various modifications of the illustrative embodiments as well as other embodiments will be apparent to those of skill in the art upon reference to the description. It is therefore intended that the appended claims encompass any such modifications.

Furthermore, some of the features of the preferred embodiments of the present disclosure could be used to advantage without the corresponding use of other features. As such, the foregoing description should be considered as merely illustrative of the principles of the disclosure, and not in limitation thereof.

What is claimed is:

1. An apparatus for detecting a defect on a surface of a substrate, comprising:
    an optical microlens array disposed directly over the substrate without an intervening optical device disposed between the optical microlens array and the substrate, the optical microlens array comprising a first optical microlens array including a plurality of first microlenses and a second optical microlens array including a plurality of second microlenses stacked on top of each other and configured to direct light incident on a second surface of the optical microlens array to exit a first surface of the optical microlens array opposite the second surface for irradiating the surface of the substrate and converge light emitted from the irradiated surface of the substrate;
    a spacer disposed on a sidewall of the optical microlens array and configured to block ambient light from entering the optical microlens array; and
    an imaging member comprising a second substrate having a first surface and a second surface opposite the first surface, a plurality of imaging units separated by a plurality of cylindrical-shaped recesses in the second substrate from the second surface and configured to receive the converged light of the optical microlens array, each of the plurality of imaging units corresponding to a stack of a first microlens and a second microlens of the optical microlens array and comprising a plurality of pixels disposed on the first surface of the second substrate, each of the cylindrical-shaped recesses comprising a light transmission opening through the second substrate for transmitting a portion of the incident light, wherein the light transmission opening has a size equals a size of a corresponding edge pixel of the plurality of pixels; and
    an incident microlens array comprising a light transmissive back plate and a plurality of cylindrical-shaped incident microlenses protruding from the light transmissive back plate and being received by the plurality of cylindrical-shaped recesses, the light transmissive back plate being in a contacting engagement with the second surface of the imaging member,
wherein the first optical microlens array comprises a plurality of first optical axes associated with the plurality of first microlenses and the second optical microlens array comprises a plurality of second optical axes associated with the plurality of second microlenses, each one of the second optical axes being aligned with one of the first optical axes.

2. The apparatus of claim 1, wherein:
wherein each of the plurality of cylindrical-shaped incident microlenses is configured to receive light from a light source and converge the received light as the incident light onto the optical microlens array.

3. The apparatus of claim 1,
further comprising an air gap between a cylindrical-shaped incident microlenses and a corresponding light transmission opening.

4. The apparatus of claim 1, wherein the incident microlenses is configured to receive light from a light source and converge the received light from the light source through the recesses into corresponding light transmission openings such that the converged light passes through the light transmission openings and radially irradiates onto corresponding microlenses.

5. The apparatus of claim 2, wherein the optical microlens array further comprises a support member configured to maintain a distance between the first optical microlens array and the second optical microlens array.

6. The apparatus of claim 1, wherein each of the imaging units receives at least a portion of light emitted from the irradiated surface of the substrate.

7. The apparatus of claim 1, wherein
the light transmission opening is disposed at an edge of a corresponding imaging unit,
the portion of the incident light passing through the light transmission opening is incident on an edge portion of a corresponding microlens in the optical microlens array; and
the optical microlens array is configured such that the portion of the incident light incident on the edge portion of the corresponding microlens is directed to a portion of the substrate surface located in a center portion of a field of view of the microlens.

8. The apparatus of claim 1, wherein the light transmission opening has a size equal to a size of a pixel.

9. The apparatus of claim 1, wherein the imaging unit has a quadrilateral light receiving surface, and the light transmission opening is disposed at a vertex of the quadrilateral light receiving surface.

10. The apparatus of claim 1, wherein the incident light and the light transmission opening are arranged such that light passing through the light transmission opening does not exceed a diffraction limit.

11. The apparatus of claim 1, wherein the emitted light from the irradiated surface of the substrate comprises reflected light reflected by the irradiated surface of the substrate and diffracted light generated by the irradiated surface of the substrate.

12. The apparatus of claim 1, wherein the first optical microlens array further comprises a first support member disposed at an edge of a first microlens and configured to support an adjacent second microlens.

13. The apparatus of claim 12, wherein the second optical microlens array further comprises a second support member disposed at an edge of a second microlens and aligned with the first support member.

14. The apparatus of claim 12, wherein the first support member comprises a same material as a material of the first microlens.

15. The apparatus of claim 12, further comprising:
a barrier layer on a lower surface of the first support member for blocking light from entering the first support member.

16. The apparatus of claim 15, wherein the barrier layer comprises a metal plating layer.

17. The apparatus of claim 1, wherein each microlens of the first and second optical microlens array comprises a plano-convex lens.

18. A system for detecting a defect on a surface of a substrate, the system comprising:
an apparatus comprising:
an optical microlens array disposed directly over the substrate without an intervening optical device disposed between the optical microlens array and the substrate, the optical microlens array comprising a first optical microlens array and a second optical microlens array stacked on top of each other and configured to direct light incident on a first surface of the optical microlens array to exit a second surface of the optical microlens array opposite the first surface for irradiating the surface of the substrate and converge light emitted from the irradiated surface of the substrate;
a spacer disposed on a sidewall of the optical microlens array and configured to block ambient light from entering the optical microlens array;
an imaging member comprising a second substrate having a first surface and a second surface opposite the first surface, a plurality of imaging units separated by a plurality of cylindrical-shaped recesses in the second substrate from the second surface and configured to receive the converged light of the optical microlens array, each of the plurality of imaging units corresponding to a stack of a first microlens and a second microlens of the optical microlens array and comprising a plurality of pixels disposed on the first surface of the second substrate, each of the cylindrical-shaped recesses comprising a light transmission opening through the second substrate for transmitting a portion of the incident light, wherein the light transmission opening has a size equals a size of a corresponding edge pixel of the plurality of pixels; and
an incident microlens array comprising a light transmissive back plate and a plurality of cylindrical-shaped incident microlenses protruding from the light transmissive back plate and being received by the plurality of cylindrical-shaped recesses, the light transmissive back plate being in a contacting engagement with the second surface of the imaging member;
a substrate support unit disposed below the apparatus and configured to support the substrate; and
an imaging processing unit coupled to the apparatus and configured to receive and process the image, angular spectrum, and energy spectrum information of the irradiated surface of the substrate,
wherein the first optical microlens array comprises a plurality of first optical axes and the second optical microlens comprises a plurality of second optical axes, each one of the second axes being aligned with one of the first optical axes.

\* \* \* \* \*